(12) United States Patent
Kawano

(10) Patent No.: US 9,165,193 B2
(45) Date of Patent: Oct. 20, 2015

(54) VIDEO PROCESSING APPARATUS AND METHOD FOR MANAGING TRACKING OBJECT

(71) Applicant: CANON KABUSHIKI KAISHA, Tokyo (JP)

(72) Inventor: Atsushi Kawano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 13/873,926

(22) Filed: Apr. 30, 2013

(65) Prior Publication Data

US 2013/0307974 A1 Nov. 21, 2013

(30) Foreign Application Priority Data

May 17, 2012 (JP) ................................. 2012-113475

(51) Int. Cl.
*H04N 7/18* (2006.01)
*G06K 9/00* (2006.01)
*G06K 9/32* (2006.01)

(52) U.S. Cl.
CPC ........ *G06K 9/00771* (2013.01); *G06K 9/00993* (2013.01); *G06K 2009/3291* (2013.01)

(58) Field of Classification Search
CPC ............ G06K 9/00771; G06K 9/3241; G06K 9/00993; G06K 2009/3291; G06T 2207/10016; G06T 7/20; G06T 2207/30196; G06T 2207/30232; G06T 2207/30241; H04N 7/181; H04N 7/188; H04N 7/18; H04N 7/183
USPC ......................................... 348/143, 158, 159

IPC ........................................................ H04N 7/18
See application file for complete search history.

(56) References Cited

U.S. PATENT DOCUMENTS

| 2009/0059007 A1* | 3/2009 | Wagg et al. | 348/157 |
| 2012/0163657 A1* | 6/2012 | Shellshear | 382/103 |
| 2014/0169663 A1* | 6/2014 | Han et al. | 382/159 |

FOREIGN PATENT DOCUMENTS

| EP | 2450832 A1 | 5/2012 |
| JP | 2010-050934 A | 3/2010 |

OTHER PUBLICATIONS

Frederic Cupillard et al. "Tracking groups of people for Video Surveillance" INRIA Sophia Antipolis, ORION group, pp. 89-100. 2004, route des Lucioles BP93-06902 Sophia Antipolis Cedex, France.

C. Djeraba et al. Multi-Modal User Interactions in Controlled Environments, DOT 10.1007/978-1-4419-0316-7_3, Springer Science+Business Media, LLC 2010—Flow Estimation, pp. 59-99.

* cited by examiner

*Primary Examiner* — Sherrie Hsia
(74) *Attorney, Agent, or Firm* — Canon U.S.A., Inc. IP Division

(57) ABSTRACT

A video processing apparatus includes a first detection unit configured to detect that a tracking target moving in a video has split into a plurality of objects, and a determination unit configured to, when the first detection unit detects that the tracking target has split into the plurality of objects, determine a number of objects included in the tracking target before splitting of the tracking target based on a number of the plurality of objects after splitting of the tracking target.

15 Claims, 9 Drawing Sheets

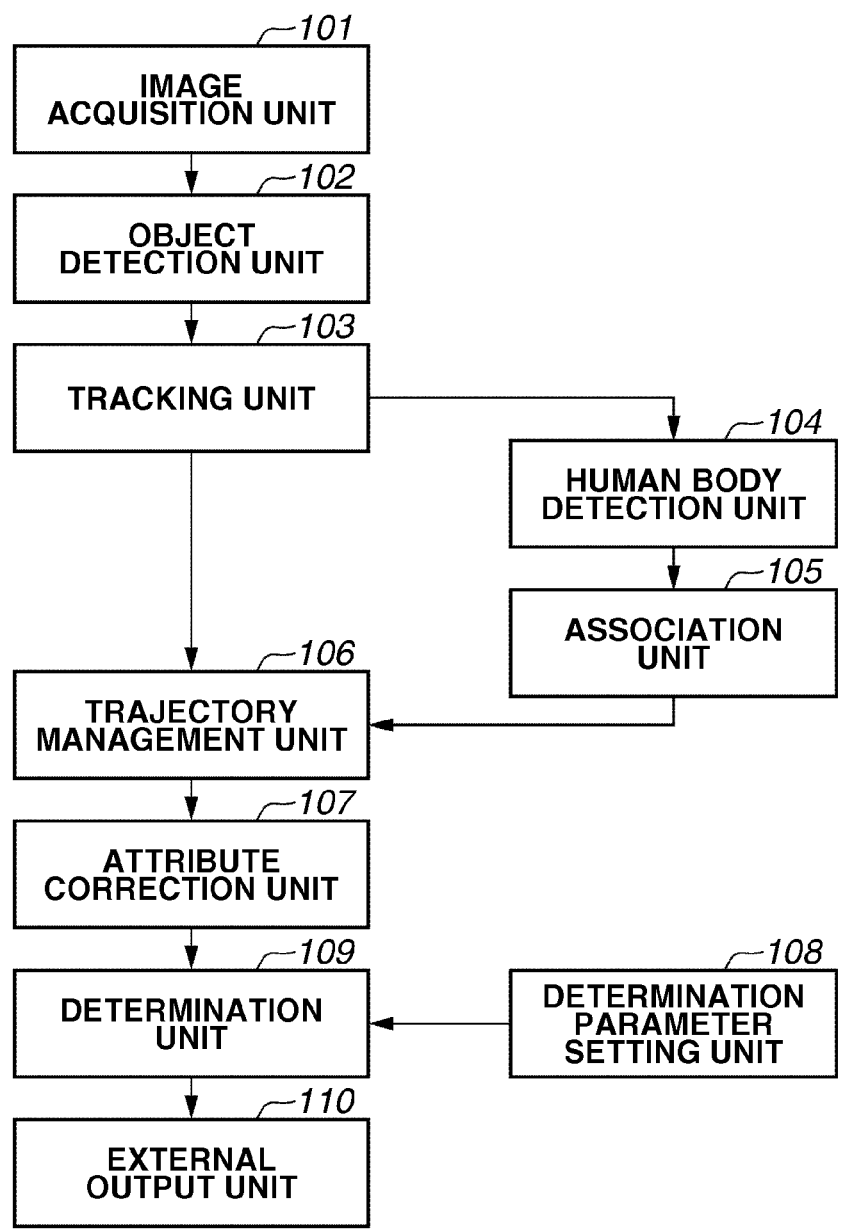

FIG.7

| Parameter1 | |
|---|---|
| Coordinates | (10,10),(20,30) |
| Region Type | Line |
| Size | 100-250 |
| Attribute | Human |
| Attribute count | 1 |
| Life time | 1- * |
| Event | cross |

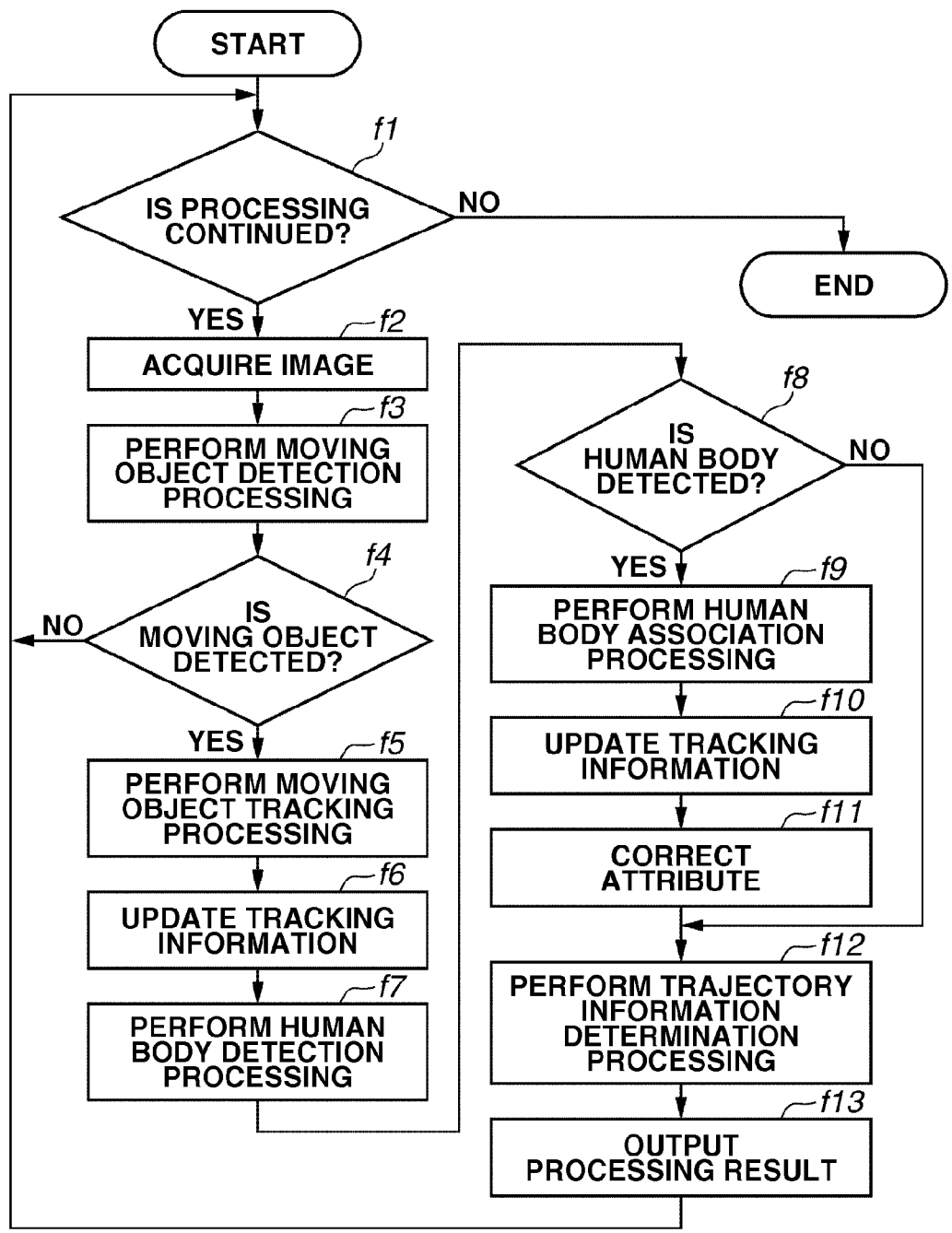

VIDEO PROCESSING APPARATUS AND METHOD FOR MANAGING TRACKING OBJECT

BACKGROUND OF THE INVENTION

1. Field of the Invention

The present invention relates to a video processing apparatus for processing a video of a monitoring camera, for example, a method for managing a tracking object, and a storage medium.

2. Description of the Related Art

Conventionally, when the number of objects or humans that have passed a specified point in a screen is counted using a video of a monitoring camera, the objects or human bodies detected in the video are tracked in the screen to detect their passing the specified point. For example, according to Japanese Patent Application Laid-Open No. 2010-50934, a face is detected based on movement information detected in relationship between a current frame and a past frame, and then the face is tracked. Whether the object has passed the specified point is determined based on a tracking result to count the object.

However, when the humans overlap each other on the screen, features required for the detection cannot be sufficiently acquired. Thus, it is difficult to keep detecting the face or the human body, and, when the face or the human body is tracked, the appropriate tracking result is not always acquired.

SUMMARY OF THE INVENTION

The present invention is directed to a video processing apparatus capable of correctly managing an attribute of a detected object, and a method for managing the attribute of the detected object.

According to an aspect of the present invention, a video processing apparatus includes a first detection unit configured to detect that a tracking target moving in a video has split into a plurality of objects, and a determination unit configured to, when the first detection unit detects that the tracking target has split into the plurality of objects, determine a number of objects included in the tracking target before splitting of the tracking target based on a number of the plurality of objects after splitting of the tracking target.

According to another aspect of the present invention, a video processing apparatus includes a first detection unit configured to detect that a plurality of objects moving in a video has merged, and a determination unit configured to, when the first detection unit detects that the plurality of objects has merged, determine a number of objects included in a tracking target, into which the plurality of objects has merged, based on a number of the plurality of objects before merging thereof.

Further features of the present invention will become apparent from the following description of exemplary embodiments with reference to the attached drawings.

BRIEF DESCRIPTION OF THE DRAWINGS

FIG. 1 is a block diagram illustrating a video processing apparatus.

FIG. 7 illustrates an example of determination parameters.

FIG. 9 is a flowchart illustrating processing.

DESCRIPTION OF THE EMBODIMENTS

Figure 2A:
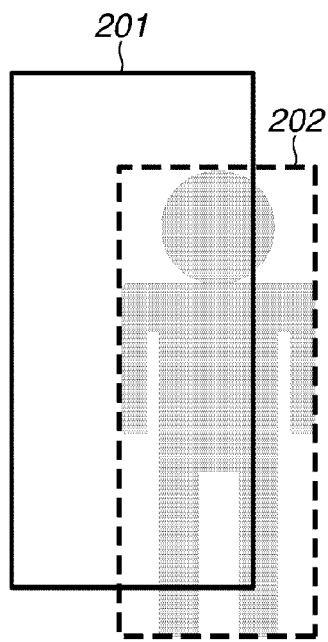
FIGS. 2A and 2B illustrate examples of association between an object and a human body.

Exemplary embodiment of the invention will be described in detail below with reference to the drawings. A configuration described in the exemplary embodiment below is only an example, and the present exemplary embodiment is not limited to the illustrated configuration.

A first exemplary embodiment will be described below. FIG. 1 illustrates a system configuration of a video processing apparatus. The video processing apparatus according to the present exemplary embodiment includes an image acquisition unit 101, an object detection unit 102, a tracking unit 103, a human body detection unit 104, an association unit 105, a trajectory management unit 106, a determination parameter setting unit 108, a determination unit 109, and an external output unit 110.

The 101 acquires an image to be processed from an outside in chronological order. An external apparatus, from which the image is acquired, is not limited to a camera, and the image stored in a server or an external memory may be used.

The object detection unit 102 detects the object (a moving object) in the image acquired by the image acquisition unit 101 by a background subtraction technique. Information about the detected object includes a position in a screen, and sizes of a bounding box and the object. The object detection unit 102 detects the object in the image, and does not limit the method to the background subtraction technique.

The tracking unit 103 tracks a moving tracking target in a video. Further, the tracking unit 103 detects that the tracking target, which has been tracked, has split into a plurality of objects. Furthermore, the tracking unit 103 detects that a plurality of objects in the video has merged.

The tracking unit 103 tracks the object detected by the object detection unit 102 in the screen. In other words, the tracking unit 103 associates the object detected by the object detection unit 102 with the object detected in a previous image. To the new object that has appeared, new object identification data (ID) is applied. To the object associated with the previous image, the object ID applied to the previous image is applied. When the objects have merged with each other, the object ID of a larger object in size, of the merged objects, is applied. Further, when the object has split into objects, the object ID applied to the previous image is applied to a larger object in size, of the split objects. A new object ID is applied to a smaller object.

The human body detection unit 104 detects that the object in the video is the specified object. The human body detection unit 104 detects a human body in a region detected by the object detection unit 102 by pattern matching processing. The human body detection unit 104 performs the processing for detecting the human body in the image, and the processing is not limited to the pattern matching processing. Further, the human body is not necessarily detected in the region detected by the object detection unit 102, and the processing for detecting the human body may be performed on the entire image. According to the present exemplary embodiment, detection of the human body will be described. However, a specified object, such as a face, vehicle, and animal, other than the human body may be detected.

Figure 2B:
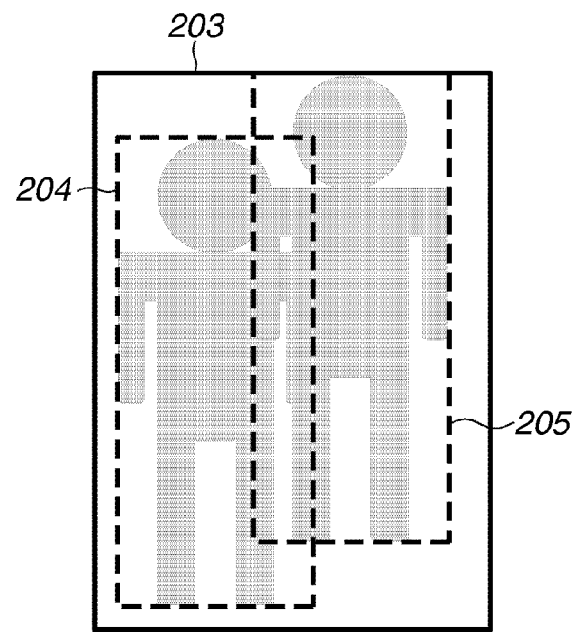

The association unit 105 associates the object detected by the object detection unit 102 with the human body detected by the human body detection unit 104. FIGS. 2A and 2B illustrate examples of association between the detected object and the detected human bodies. FIG. 2A illustrates a case where a bounding box (circumscribed rectangle) 202 for the detected human body is not included in a bounding box 201 for the detected object. In this case, when a overlap ratio of the bounding box 202 for the human body relative to the bounding box 201 for the object exceeds a previously set threshold value, it is defined that the object is associated with the human body. The overlap ratio refers to a ratio of an area of a portion where the bounding box 201 for the object overlaps the bounding box 202 for the human body to an area of the bounding box 202 for the human body. The association unit 105 associates the object with the number of human bodies.

FIG. 2B illustrates a case where a plurality of human bodies is detected in the bounding box 203 for the detected object. In this case, when the overlap ratio of each of the bounding box 204 for the human body and the bounding box 205 for the human body to the bounding box 203 for the object exceeds the previously set threshold value, it is defined that each human body is associated with the object.

The trajectory management unit 106 manages a trajectory of the tracking target being tracked. The trajectory management unit 106 manages movement information about the object that is tracked by the tracking unit 103 and associated with the human body by the association unit 105. Further, the trajectory management unit 106 applies the information about the human body associated by the association unit 105 to the tracking object tracked by the tracking unit 103 as an attribute of the object and manages the information. When the tracking unit 103 detects that the tracking target has split into a plurality of objects, the trajectory management unit 106 manages a trajectory of the tracking target before splitting of the tracking target as the trajectories of the plurality of objects after splitting of the tracking target. Further, when the human body detection unit 104 detects that the object after the tracking object has split is the specified object (e.g., a human body), the trajectory management unit 106 manages the trajectory of the tracking target before splitting of the tracking target as the trajectory of the specified objet. Furthermore, when the tracking unit 103 detects that a plurality of objects has merged, the trajectory management unit 106 manages the trajectory of the tracking target, into which the plurality of objects has merged, as the trajectories of the plurality of objects before merging thereof. Moreover, when the human body detection unit 104 detects that the plurality of objects before merging thereof is the specified object, the trajectory management unit 106 manages the trajectory of the tracking target, into which the plurality of the objects has merged, as the trajectories of the plurality of specified objects before merging thereof.

Figure 3:
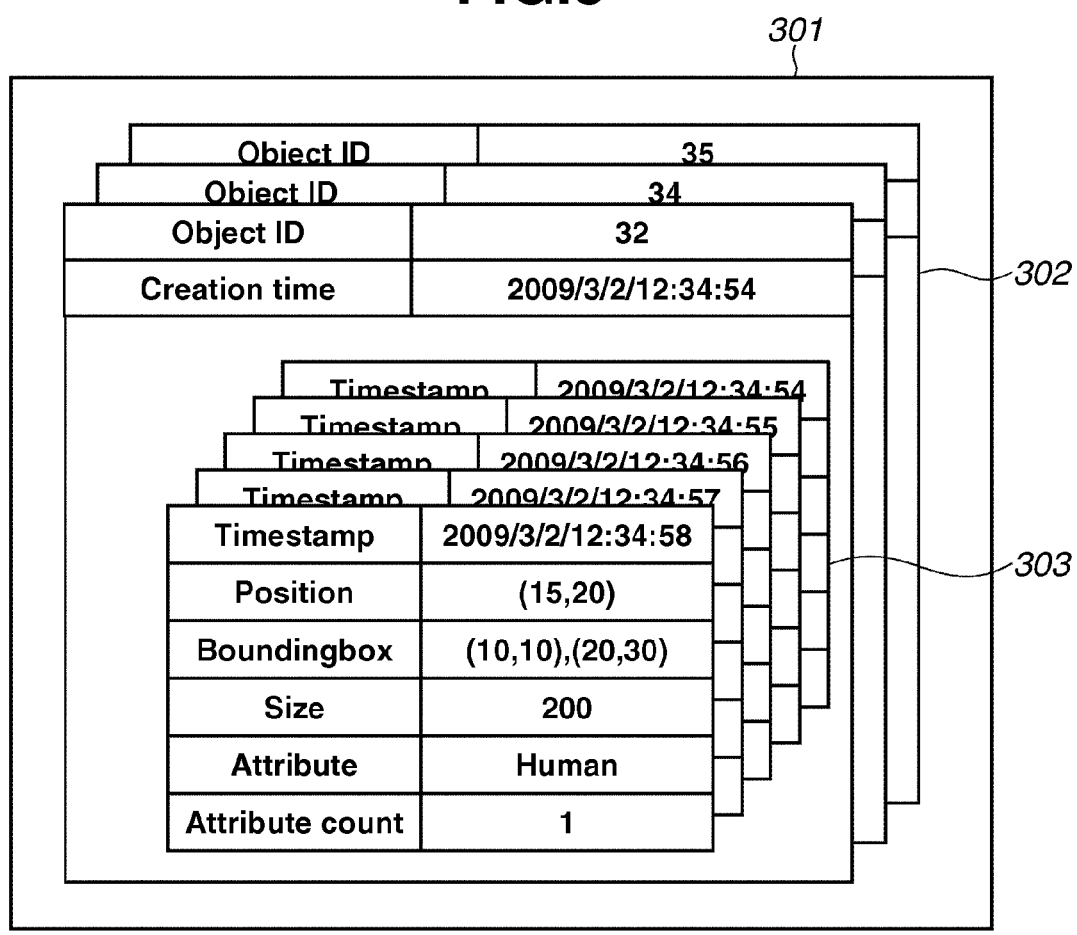
FIG. 3 illustrates an example of management of movement information about the object.

FIG. 3 illustrates an example of management of the movement information about the object. The trajectory management unit 106 manages movement information 301 about the tracking object as object information 302 for each object ID. The object information 302 includes a pair of a time when the object is first detected and position information 303 including a time when the object is detected, a position on the screen, a bounding box, a size, the attribute of the object, the number of attributes, and an event. The attribute of the object herein indicates "none" or "human body", and the number of attributes refers to the number of human bodies associated with the object by the association unit 105.

With regard to the attribute of the object and the number of attributes, the human body detection unit 104 detects the human body, and the attribute and the number of attributes of the associated position information are updated according to a result by the association unit 105. Further, the attribute and the number of attributes of the past position information are also updated based on the result described above. Furthermore, the result described above is also set to the attributes and the number of attributes of the subsequent position information.

Figure 4:
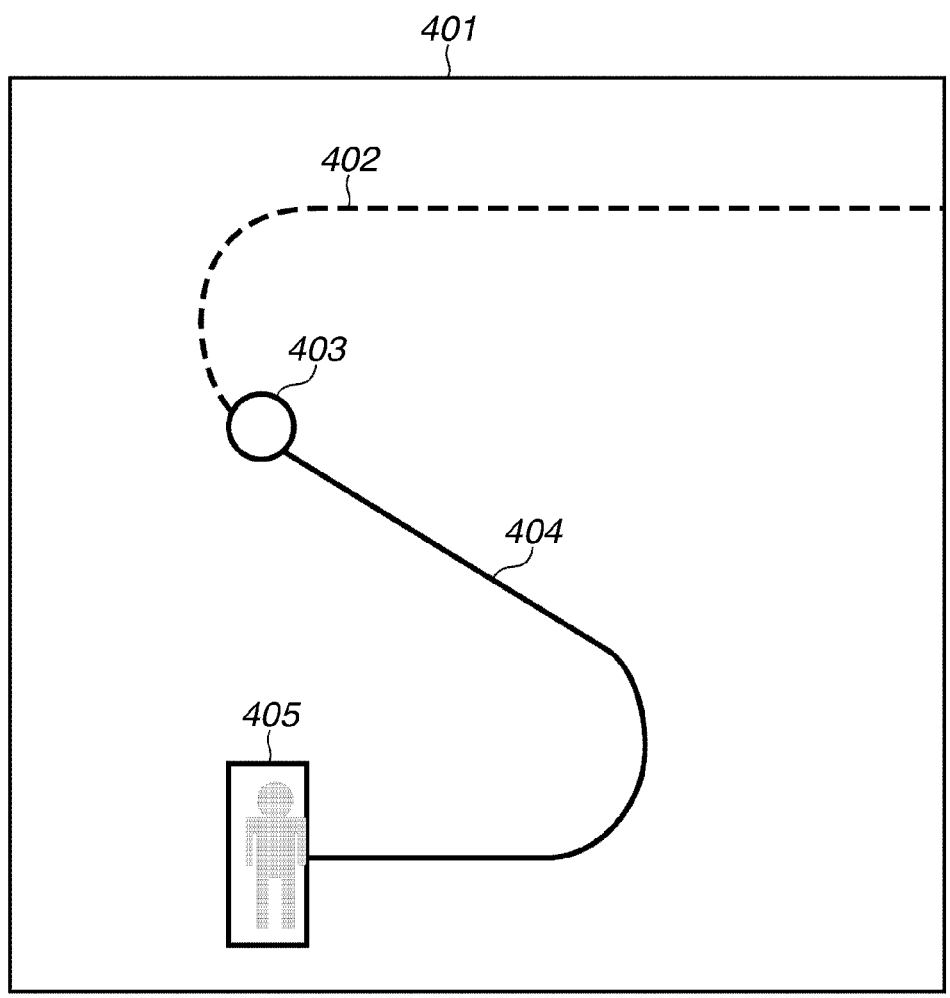
FIG. 4 illustrates an example of updating position information.

FIG. 4 illustrates an example of updating the position information. For example, when the human body is associated with the tracking object at a spot 403, the attribute and the number of attributes associated at the spot 403 are set to the subsequent position information, so that the object is treated to have the attribute of the human body during a trajectory 404. Further, the attributes and the number of attributes associated at the spot 403 are set to the past position information, so that the object can be treated to have the attribute of the human body during a trajectory 402.

The attribute of the object is determined by the human body detection unit 104 according to the present exemplary embodiment, however, the attribute of the object is not limited to the attribute described above. The attribute may include the face, vehicle, and animal, and any unit may be used as long as the target can be recognized and determined to be the attribute of the object. Further, a plurality of types of specified object detection units may be included. When the object has a plurality of attributes at a time, the object may be provided with the plurality of types of attribute and the number thereof.

The event indicates that the tracking objects have merged or split according to an output of the tracking unit 103. When the split or the mergence has not occurred, nothing is indicated. When the tracking objects have merged, a merging flag indicating that the objects have merged, and all object IDs of the merged objects are described. When the object has split, a split flag indicating that the object has split and the object ID of another split object are described.

The attribute correction unit 107 corrects the attribute and the number of attributes of the past position information according to content described in the event (merge or split) of newest position information and the past position information, of the movement information about the tracking object managed by the trajectory management unit 106.

The attribute correction unit 107 determines the number of objects included in the tracking object being tracked according to the detection, in which the plurality of the objects has merged to become the tracking target. When the tracking unit 103 detects that the tracking target has split into a plurality of objects, the attribute correction unit 107 determines the number of objects included in the tracking target before splitting of the tracking target based on the number of objects included in the tracking objects after splitting of the tracking target. Further, when the tracking unit 103 detects that a plurality of tracking targets has merged, the attribute correction unit 107 determines the number of objects included in the tracking target after merging thereof based on the number of objects included in the plurality of tracking targets before merging thereof. How to determine the number of objects included in the tracking target will be described below.

Figure 5:
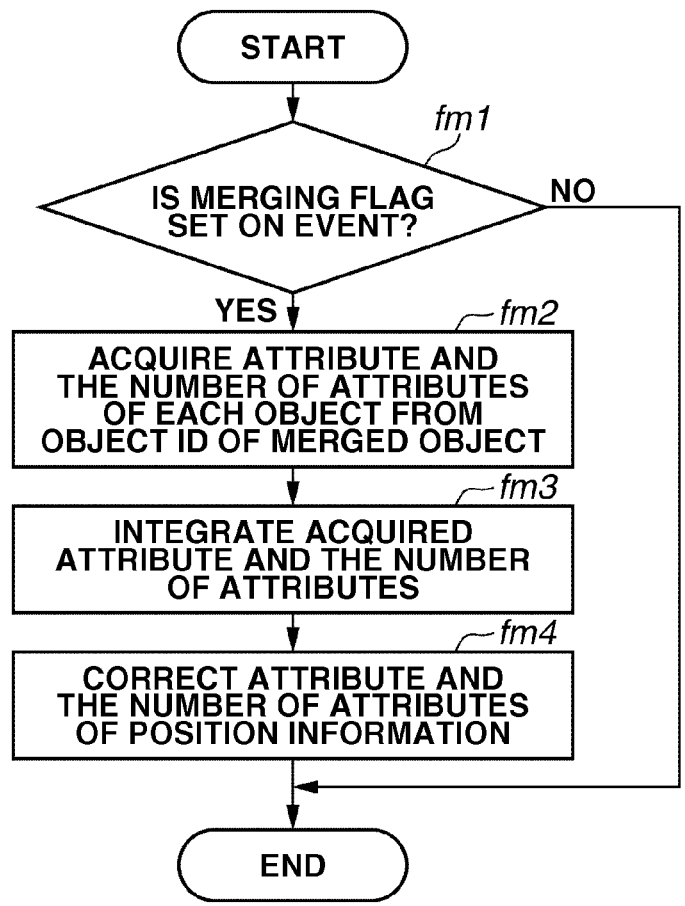
FIG. 5 is a flowchart when mergence is performed.

When the merging flag is set to the event of the newest position information, the attribute correction unit 107 corrects the attribute and the number of attributes according to the flowchart illustrated in FIG. 5. When the attribute correction unit 107 includes a computer, the flowchart illustrated in FIG. 5 indicates a part of a program to be read by the computer from a memory to be executed.

In step fm1, the event of the newest position information (defined as position information A) is checked. When the merging flag is set (YES in step fsm1), in step fm2, the plurality of merged objects is searched according to the object ID descried in the newest position information, and the respective attribute and the number of attributes, which are described in the newest position information before merging, are acquired. In step fm3, the attributes and the number of attributes acquired from the position information about each object are integrated for each attribute, and then, in step fm4, the integrated result is set to the position information A. In other words, when the trajectories of two or more objects have merged, the attribute correction unit 107 corrects the number of attributes of the merged objects, which is managed by the trajectory management unit 106, based on a result of a total obtained for each attribute.

Figure 6:
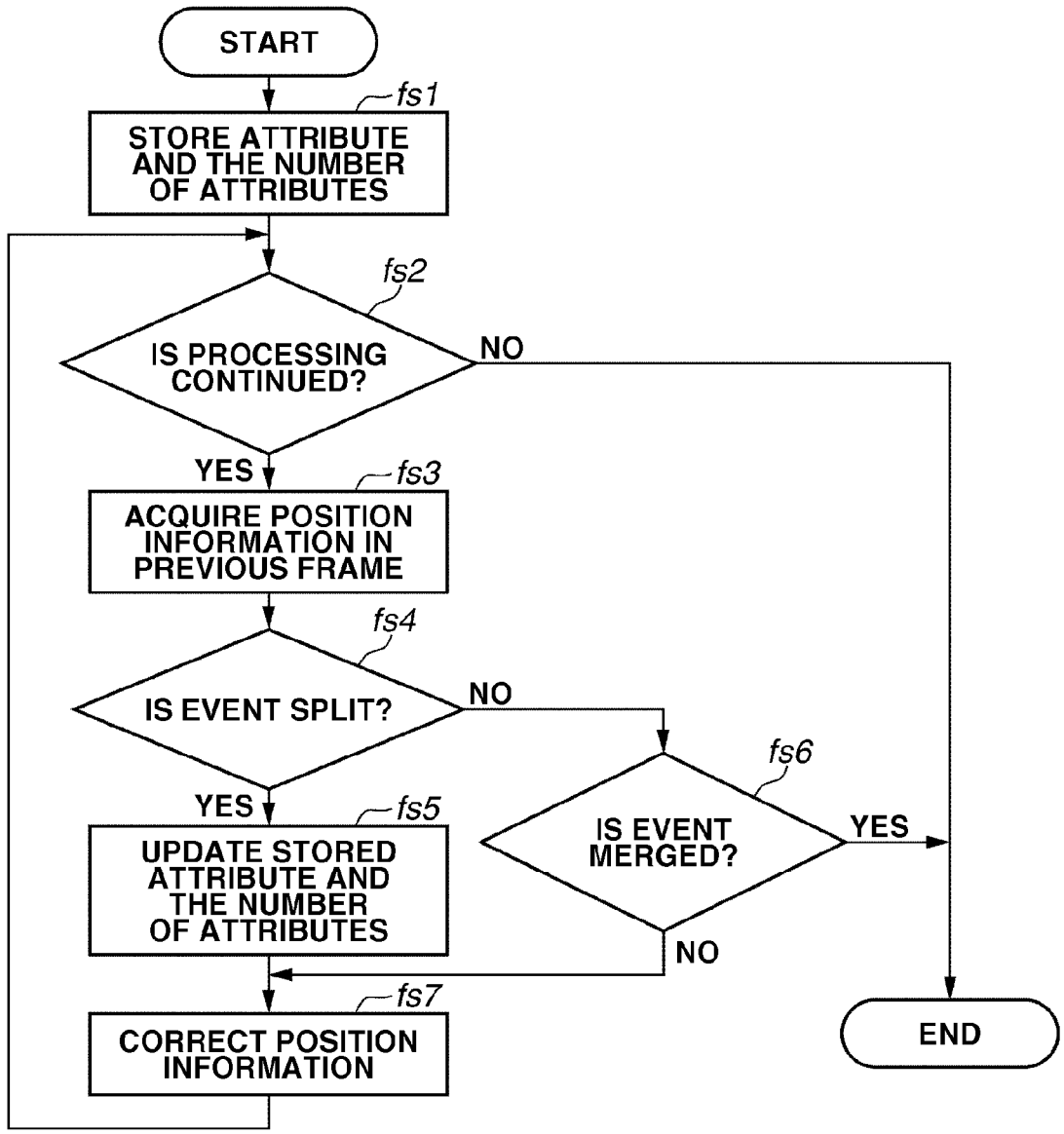
FIG. 6 is a flowchart when split is performed.

Further, when the trajectory management unit 106 updates the attribute and the number of attributes of the associated position information based on the result by the association unit 105, if the split event has occurred in the past, the attribute correction unit 107 corrects the attributes and the number of attributes according to the flowchart illustrated in FIG. 6. When the attribute correction unit 107 includes the computer, the flowchart in FIG. 6 illustrates a part of the program to be read by the computer from the memory to be executed.

In step fs1, the attribute and the number of attributes (defined as attribute information A) are stored. In step fs2, whether to continue the processing is determined. When the position information is updated a predetermined number of times or more, the processing ends. When the processing is continued (YES in step fs2), then in step fs3, the position information (defined as position information B) about the object in the previous frame is acquired. When the event of the acquired position information indicates "split" (YES in step fs4), according to the object ID of another object described in the acquired position information, the position information after splitting about another object, which has split from the object, is acquired. When the stored attribute and the stored number of attributes (attribute information A), and the attribute and the number of attributes of the position information about another split object are totaled for each attribute, and when a total value is different from the number of attributes of the position information B, then in step fs5, the total value is updated to the total value of the attribute information A.

When the event of the position information indicates "merge" (YES in step fs6), the processing ends. When the event does not indicate "merge" (NO in step fs6), then in step fs7, the attribute and the number of attributes in the position information B are corrected to those in the attribute information A. As described above, the attribute and the number of attributes of the object before splitting are corrected based on the result acquired by totaling the number of attributes of each split object for each attribute.

The determination parameter setting unit 108 sets to the determination unit 109 a determination parameter for determining trajectory information about the object from an outside. The determination parameter includes a pair of coordinates indicating a location for performing the determination, a region type for determining as which of a "region" or "line" the pair of the coordinates is treated, a range of an object size, the attribute and the number of attributes of the object, a range of an existing time on the screen, and the detected event.

FIG. 7 illustrates an example of the determination parameter. This indicates an example of detecting that an object having a size from 100 to 250, the attribute of the human body, the number of attributes of 1, and the existing time of one second or more has passed a line segment connecting coordinates (10, 10) with coordinates (20, 30).

Figure 8:
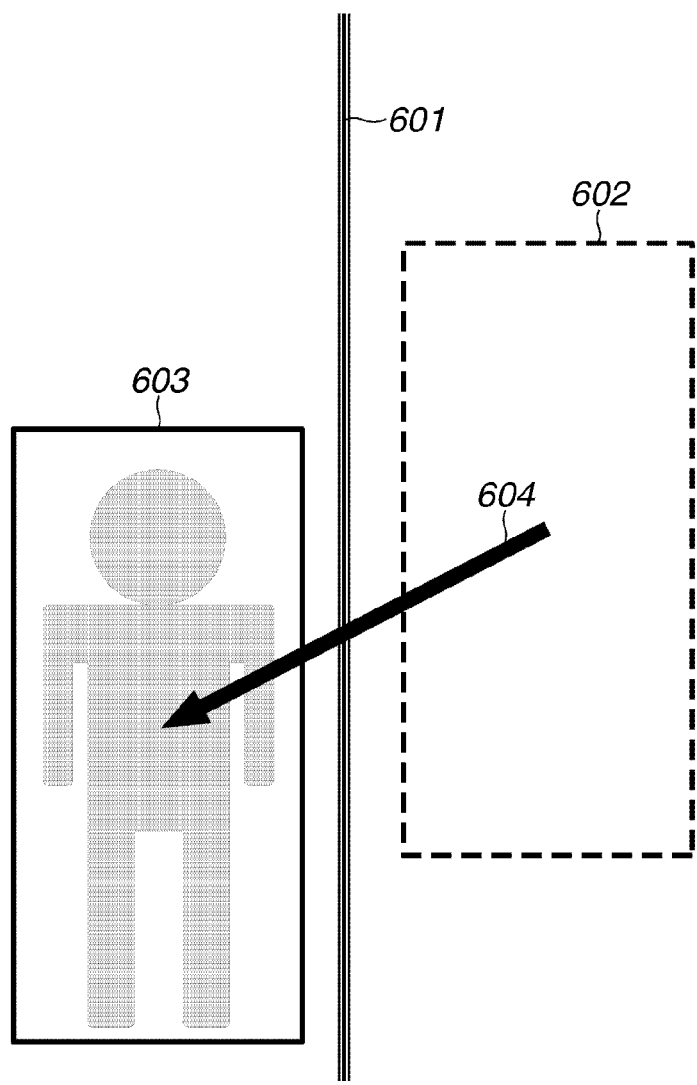
FIG. 8 illustrates an example of line segment pass determination.

FIG. 8 illustrates an example of line segment pass determination. The pass of the line segment is determined depending on whether a line segment 604 connecting a bounding box 602 for the object in the previous image with a center point of a bounding box 603 for the object in the current image has crossed a determination line segment 601.

The determination unit 109 acquires the number of objects that have passed a predetermined line or a predetermined region set on a display image in the video. The determination unit 109 detects a desired object by determining the trajectory information about the tracking object managed by the trajectory management unit 106 according to the determination parameter set by the determination parameter setting unit 108. The determination processing of the trajectory information is performed on the set all determination parameters each time when the trajectory information is updated by the trajectory management unit 106 or each time when the attribute information is corrected by the attribute correction unit 107. In other words, the determination unit 109 determines that the trajectory of the managed object has passed the specified location in the screen, and, when the attributes are corrected by the attribute correction unit 107, the determination result of the pass is corrected according to the corrected attribute.

For example, when, after the object passes the specified location, the tracking target splits, and when it is detected that at least one of the split objects is the human, the trajectory that has been tracked before splitting is managed as the trajectory of the tracking target including the human.

With this arrangement, if the determination is performed according to the determination parameter illustrated in FIG. 7, when the object exceeds the determination line segment 601, the human body detection unit 104 and the association unit 105 have not associated the attributes of the human body with the object, and the subsequently associated object can be also detected. The trajectory management unit 106 may perform the determination of the pass.

The external output unit 110 outputs the trajectory information about the tracking object managed by the trajectory management unit 106 and the determination result by the determination unit 109 to the outside.

The method in which the attribute correction unit 107 corrects the attributes and the number of attributes managed by the trajectory management unit 106 is described. However, the present exemplary embodiment is not limited to the method. When the event of the newest position information is "split", of the trajectories managed by the trajectory management unit 106, the trajectory of the split object may be duplicated and managed as a trajectory of each split object. In other words, according to this method, when the trajectory of the object splits, and, when the result of totaling the number of attributes of each split object for each attribute is different from the number of attributes of the object before splitting, the trajectory of the object before splitting that is managed by the trajectory management unit 106 is duplicated, and then it is defined as the trajectory of the split object. Further, each split attribute is corrected to the attribute after splitting.

Furthermore, when the event of the newest position information indicates "merge", the tracking result of the merged object acquired after mergence by the tracking unit 103 may be duplicated and managed as the trajectories of a plurality of objects. In other words, according to this method, when the trajectories of two or more objects have merged, the attribute correction unit 107 duplicates the merged trajectory managed by the trajectory management unit 106 and defines the duplicated trajectory as the trajectory following the trajectory before mergence, and then, the attribute of each duplicated trajectory is corrected to the attribute before mergence.

FIG. 9 is a flowchart illustrating a procedure of processing. When the video processing apparatus illustrated in FIG. 1 includes the computer, the flowchart in FIG. 9 illustrates the part of the program read by the computer from the memory to be executed.

In step f1, it is determined whether to continue or to end the processing. When the processing is continued (YES in step f1), then in step f2, the image acquisition unit 101 acquires the image from the outside. Subsequently, in step f3, the object detection unit 102 performs object detection processing on the acquired image. In step f4, the result of the object detection processing is determined. When the object is detected (YES in step f4), the processing proceeds to step f5, and, when the object is not detected (NO in step f4), the processing returns to step f1. When the object is detected, then in step f5, the tracking unit 103 performs tracking processing on the object, and in step f6, the trajectory management unit 106 updates the trajectory information based on the result of the tracking processing.

Subsequently, in step f7, the human body detection unit 104 performs human body detection processing, and in step f8, the result of the human body detection processing is determined. When the human body is detected (YES in step f8), the processing proceeds to step f9, and, when the human body is not detected (NO in step f8), the processing proceeds to step f12. When the human body is detected, then in step f9, the association unit 105 performs association processing between the object and the human body. Subsequently, in step f10, the trajectory management unit 106 updates the trajectory information based on the result of the association processing, and then, the attribute correction unit 107 corrects the attribute. In step f12, the determination unit 109 performs determination processing on the trajectory information, and in step f13, the result of the determination processing is output to the outside.

As described above, according to the exemplary embodiment of the present invention, the human body can be tracked even in the video in which detecting the face of the object and features of the human body is difficult, and, further, by updating the tracking information, the human body can be counted with high accuracy. According to the exemplary embodiment of the present invention configured as described above, the attribute of the detected object can be correctly managed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-113475 filed May 17, 2012, which is hereby incorporated by reference herein in its entirety.

What is claimed is:

1. A video processing apparatus comprising:
a first detection unit configured to detect that a tracking target moving in a video has split into a plurality of objects; and
a determination unit configured to, when the first detection unit detects that the tracking target has split into the plurality of objects, determine a number of objects included in the tracking target before splitting of the tracking target based on a number of the plurality of objects after splitting of the tracking target.

2. The video processing apparatus according to claim 1, further comprising a management unit configured to manage a trajectory of the tracking target,
wherein, when the first detection unit detects that the tracking target has split into the plurality of objects, the management unit is configured to manage the trajectory of the tracking target before splitting of the tracking target as trajectories of the plurality of objects after splitting of the tracking target.

3. The video processing apparatus according to claim 1, further comprising an acquisition unit configured to acquire a number of objects that has passed a predetermined line or a predetermined region set on a display image in the video,
wherein, after the tracking target has passed the predetermined line or the predetermined region set on the display image, when the first detection unit detects that the passed tracking target has split, the acquisition unit acquires the number of objects that has passed the predetermined line or region based on the number of the plurality of objects after splitting of the tracking target.

4. The video processing apparatus according to claim 1, further comprising:
a second detection unit configured to detect that the object in the video is a specified object; and
a management unit configured to manage a trajectory of the tracking target,
wherein, when the second detection unit detects that the object obtained after the tracking target has split is the specified object, the management unit is configured to manage the trajectory of the tracking target before splitting of the tracking target as a trajectory of the specified object detected by the second detection unit.

5. A video processing apparatus comprising:
a first detection unit configured to detect that a plurality of objects moving in a video has merged; and
a determination unit configured to, when the first detection unit detects that the plurality of objects has merged, determine a number of objects included in a tracking target, into which the plurality of objects has merged, based on a number of the plurality of objects before merging thereof.

6. The video processing apparatus according to claim 5, further comprising a management unit configured to manage a trajectory of the tracking target,
wherein, when the first detection unit detects that the plurality of objects has merged, the management unit is configured to manage the trajectory of the tracking target, into which the plurality of objects has merged, as trajectories of the plurality of objects before merging thereof.

7. The video processing apparatus according to claim 5, further comprising:
a second detection unit configured to detect that the object in the video is a specified object; and
a management unit configured to manage a trajectory of the tracking target,
wherein, when the second detection unit detects that the plurality of objects before merging thereof is the specified object, the management unit is configured to manage the trajectory of the tracking target, into which the plurality of objects has merged, as trajectories of the plurality of specified objects before merging thereof.

8. A video processing method comprising:
detecting that a tracking target moving in a video has split into a plurality of objects; and
determining, when it is detected that the tracking target has split into the plurality of objects, a number of objects included in the tracking target before splitting of the tracking target based on a number of the plurality of objects after splitting of the tracking target.

9. The video processing method according to claim 8, further comprising managing, when it is detected that the tracking target has split into the plurality of objects, a trajectory of the tracking target before splitting of the tracking target as trajectories of the plurality of objects after splitting of the tracking target.

10. A video processing method comprising:
detecting that a plurality of objects moving in a video has merged; and
determining, when it is detected that the plurality of objects has merged, a number of objects included in a tracking target, into which the plurality of objects has merged, based on a number of the plurality of objects before merging thereof.

11. The video processing method according to claim 10, further comprising managing, when it is detected that the plurality of objects has merged, a trajectory of the tracking target, into which the plurality of objects has merged, as trajectories of the plurality of objects before merging thereof.

12. A non-transitory computer-readable storage medium storing a program that causes a computer to execute video processing, the program comprising:
computer-executable instructions that detects that a tracking target moving in a video has split into a plurality of objects; and
computer-executable instructions that determines, when it is detected that the tracking target has split into the plurality of objects, a number of objects included in the tracking target before splitting of the tracking target based on a number of the plurality of objects after splitting of the tracking target.

13. The non-transitory computer-readable storage medium according to claim 12, the program further comprising computer-executable instructions that manages, when it is detected that the tracking target has split into the plurality of objects, a trajectory of the tracking target before splitting of the tracking target as trajectories of the plurality of objects after splitting of the tracking target.

14. A non-transitory computer-readable storage medium storing a program that causes a computer to execute video processing, the program comprising:
computer-executable instructions that detects that a plurality of objects moving in a video has merged; and
computer-executable instructions that determines, when it is detected that the plurality of objects has merged, a number of objects included in a tracking target, into which the plurality of objects has merged, based on a number of the plurality of objects before merging thereof.

15. The non-transitory computer-readable storage medium according to claim 14, the program further comprising computer-executable instructions that manages, when it is detected that the plurality of objects has merged, a trajectory of the tracking target, into which the plurality of objects has merged, as trajectories of the plurality of objects before merging thereof.

* * * * *